United States Patent [19]

Gang

[11] Patent Number: 5,454,186

[45] Date of Patent: Oct. 3, 1995

[54] INSECT TRAP KIT

[76] Inventor: Bong K. Gang, 99-07 43rd Ave., Apt. 3-B, Corona, N.Y. 11368

[21] Appl. No.: 223,622

[22] Filed: Apr. 6, 1994

[51] Int. Cl.$^6$ ................................................ A01M 1/14
[52] U.S. Cl. ................................................ 43/114
[58] Field of Search ........................... 43/114, 108, 121, 43/132.1

[56] References Cited

U.S. PATENT DOCUMENTS

| | | |
|---|---|---|
| 919,149 | 4/1909 | Foster . |
| 2,328,590 | 9/1943 | Weil . |
| 2,808,679 | 10/1957 | Collins . |
| 2,911,756 | 11/1959 | Geary . |
| 3,816,956 | 6/1974 | Sekula . |
| 3,913,259 | 10/1975 | Nishimura et al. . |
| 3,968,590 | 7/1976 | Kitterman . |
| 4,052,811 | 10/1977 | Shuster et al. . |
| 4,217,722 | 8/1980 | McMullen ................. 43/114 |
| 4,349,981 | 9/1982 | Sherman . |
| 4,709,504 | 12/1987 | Andric ..................... 43/114 |
| 4,800,671 | 1/1989 | Olson ....................... 43/114 |
| 4,829,702 | 5/1989 | Silvandersson ........... 43/114 |
| 4,862,638 | 9/1989 | Stevenson . |
| 4,876,823 | 10/1989 | Brunetti ................... 43/114 |
| 5,157,866 | 10/1992 | Rosie . |

FOREIGN PATENT DOCUMENTS 2166034  4/1986  United Kingdom ................ 43/114

Primary Examiner—Kurt Rowan
Attorney, Agent, or Firm—Jordan and Hamburg

[57] ABSTRACT

An insect trap kit includes a base having an adhesive for trapping insects, bridges to be placed on the base for creating passageways for insects on the base and a cover, which is placed on top of the bridges, for covering the insect trap. The areas at the edges of the trap, where the insects enter the trap, are not coated with adhesive to prevent an insect from being "trapped" in the trap prior to fully entering the trap.

5 Claims, 3 Drawing Sheets

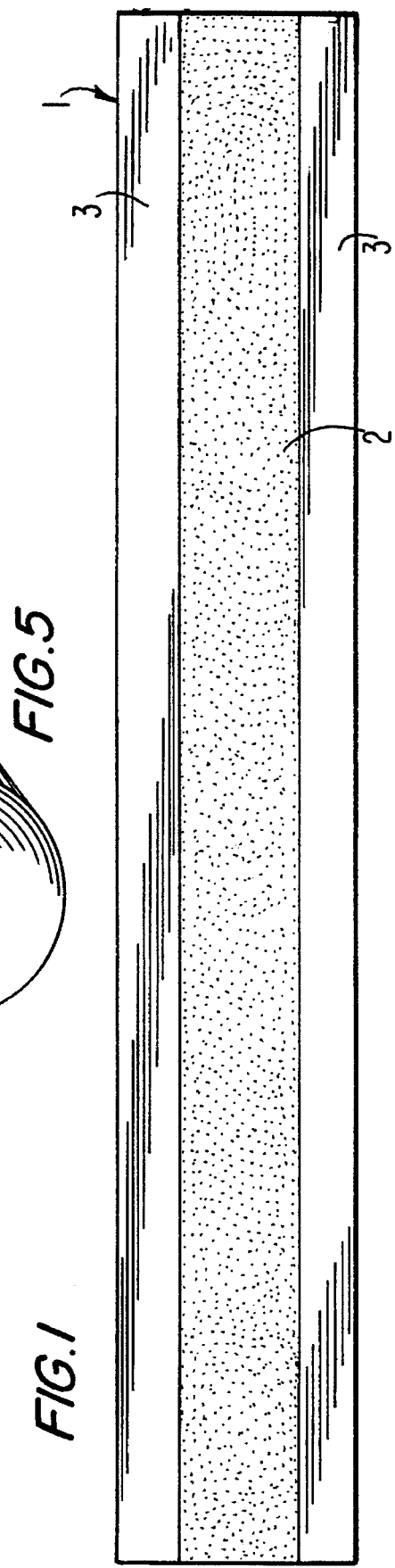
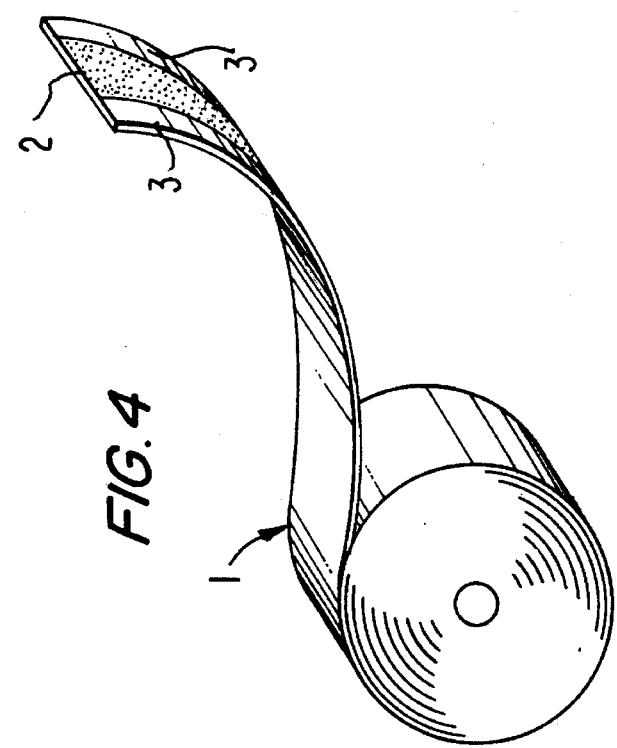
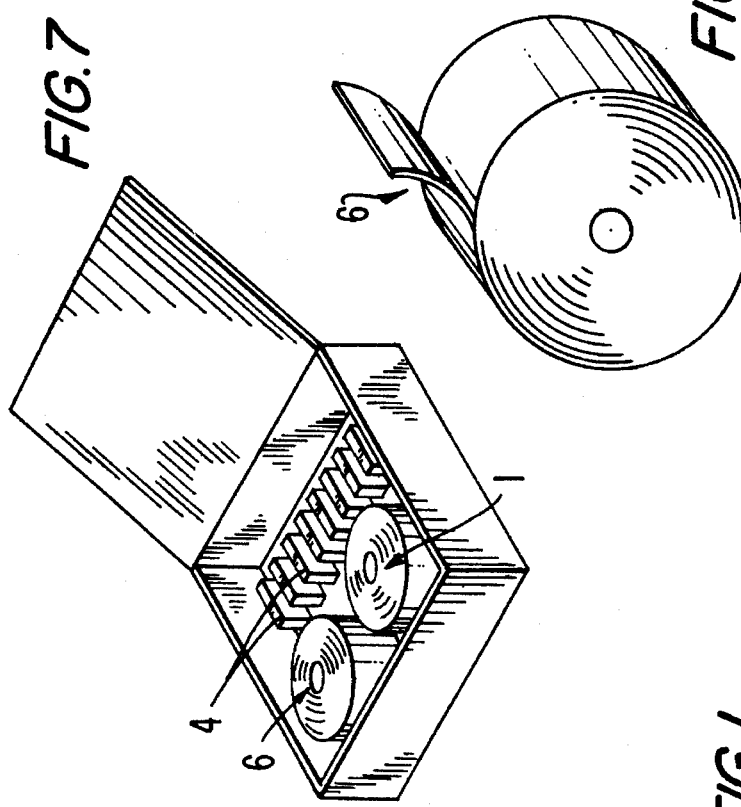
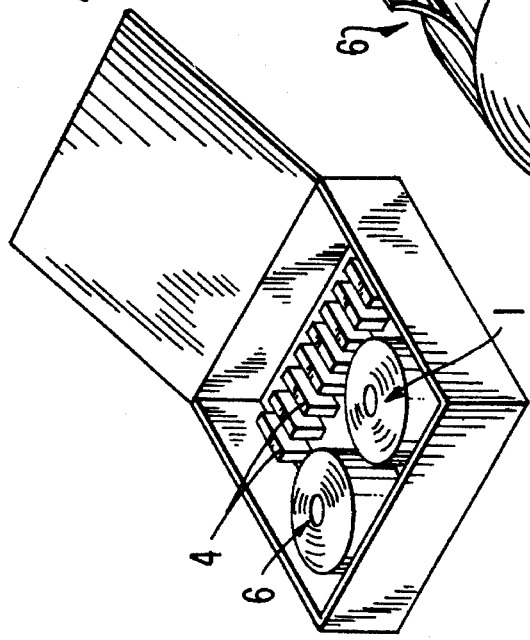

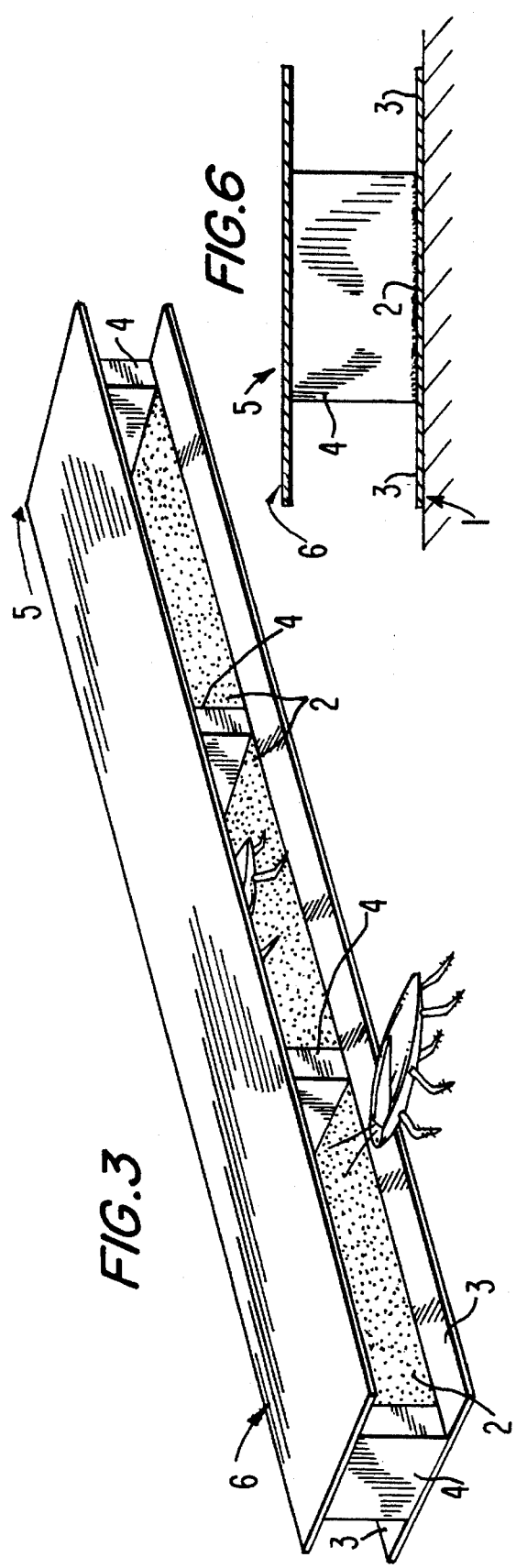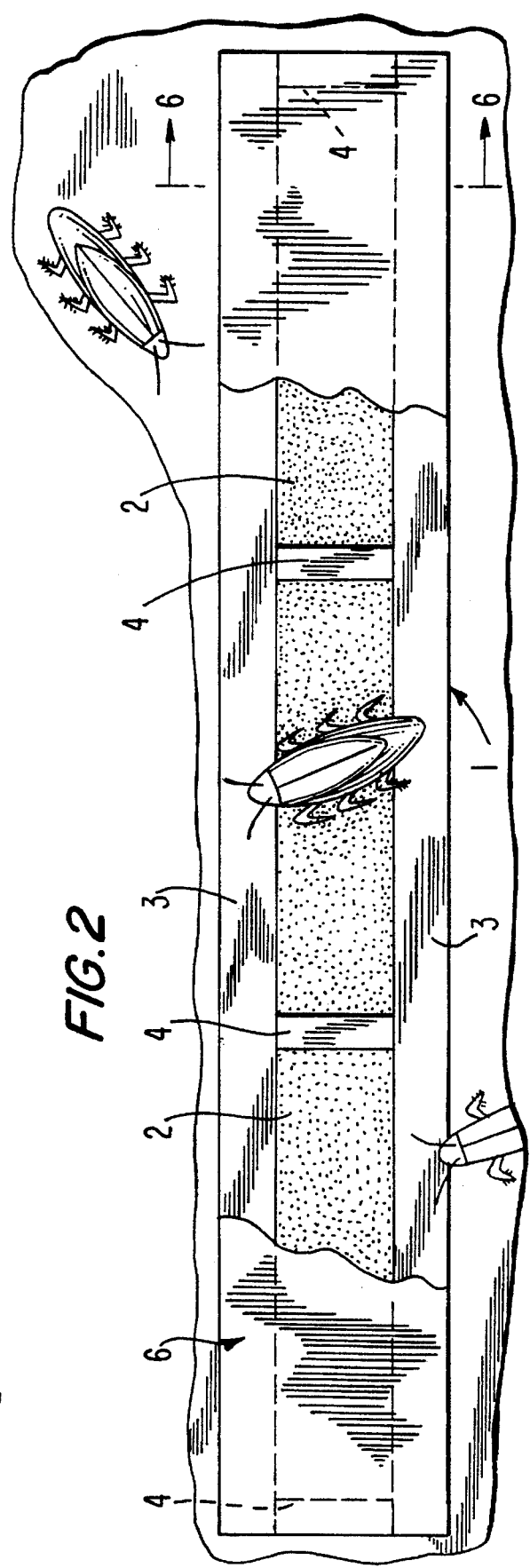

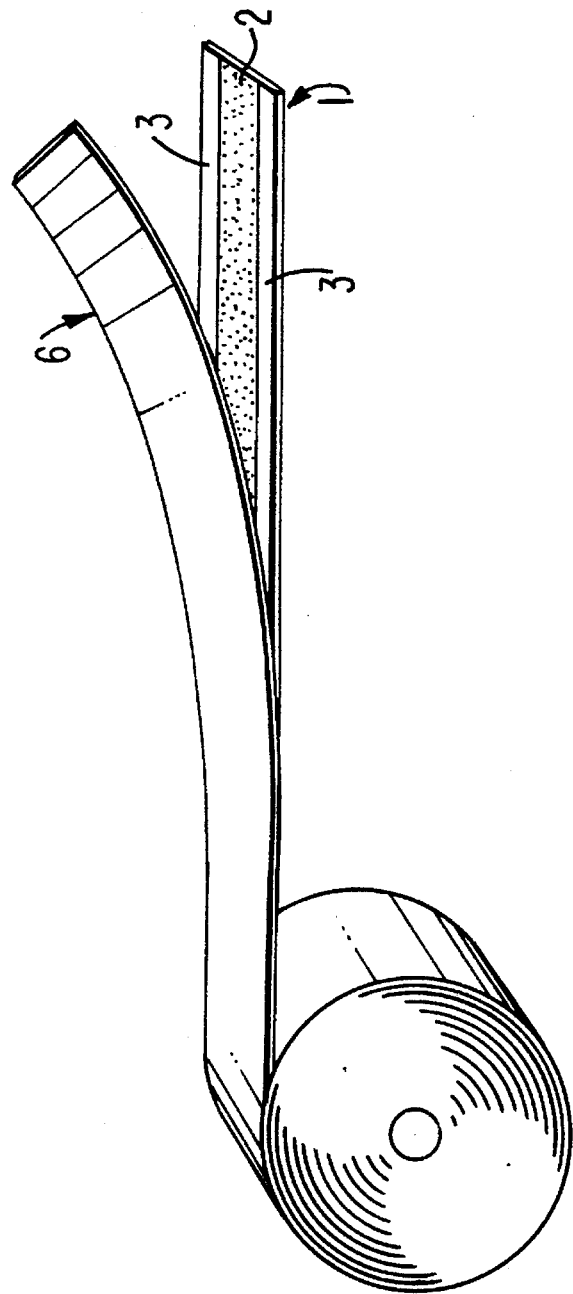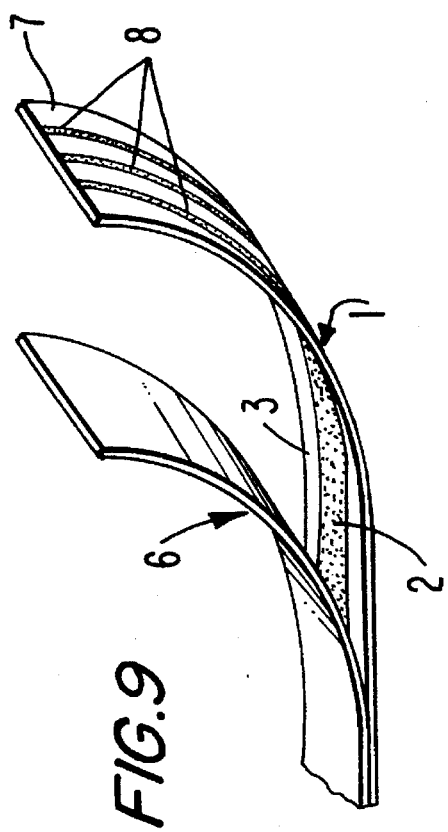

INSECT TRAP KIT

BACKGROUND OF THE INVENTION

The present invention relates to a kit for trapping insects. The kit of the present invention allows a purchaser to efficiently and inexpensively construct a trap for insects according to the purchaser's specifications.

Prior art insect traps offer little or no opportunity for the user to customize the insect trap. Further, most insect traps on the market today are expensive and cannot be re-used once filled with insects or when no longer effective.

For example, U.S. Pat. No. 4,709,504, to Andric, is a portable insect trap folded lengthwise, to create an insect run and a roof. It uses tabs to create transverse walls to hold up the roof and create dark slit openings to attract insects. An adhesive lines the bottom of the trap, but is set back from the edges to make the trap easily and safely handled and used.

Sekula, U.S. Pat. No. 3,816,956, is a roll of double-sided adhesive tape. One side of the tape sticks to a surface, while the other side contains an attractant for insects.

U.S. Pat. No. 2,808,679, to Collins, has an adhesive on its lower surface to adhere it to areas where an insect trap is desired. The upper surface of Collins has a poison which acts as an insecticide.

Foster, U.S. Pat. No. 919,149 is a double sided adhesive "fly tape" having removable tabs covering a surface not coated by adhesive. The tabs are removed prior to cutting the tape to expose a non-adhesive surface, which can be cut without resulting in adhesive adhering to the cutting instrument.

U.S. Pat. No. 2,328,590, to Well, is a roach run constructed as an elongated box, which is open at both ends. The box is lined with an adhesive for trapping insects. However, the inner edges of the box are not coated with an adhesive, to prevent the adhesive material from flowing.

Geary, U.S. Pat. No. 2,911,756, is a roll of double-sided adhesive tape having one side to adhere to a surface and another side to hold an insect. The side for holding an insect preferably includes a poison.

U.S. Pat. No. 3,913,259, to Nishimura, is an adhesive which it contends has the ability to hold an insect's leg better than other adhesives. It may contain an attractant or poison. Additionally, it may be used to line a trap.

Rosie, U.S. Pat. No. 5,157,866, is an earwig collector in the shape of a box, with passageways, for trapping earwigs.

U.S. Pat. No. 4,862,638, to Stevenson, is a tarp, such as that used under a sleeping bag when camping, which has an adhesive- or water-trap at its periphery for trapping insects.

Sherman, U.S. Pat. No. 4,349,981, is an insect trap which holds a contact poison. The edges of the trap are lined with felt to wipe the poison off the insect's feet, to minimize the amount of poison brought outside the trap.

U.S. Pat. No. 4,052,811, to Shuster, is a hand-held device coated with adhesive. A user brings the device in contact with insects to trap the insects on the adhesive.

Kitterman, U.S. Pat. No. 3,968,590, is a disk-shaped insect trap with a central hole for mounting the trap on a pole-shaped object, for example, a tree. The trap uses adhesives and attractants to trap insects. A removable panel is provided for ease of cleaning out trapped insects.

None of the insect trapping devices discussed above are in the form of a kit. Accordingly, these traps, as well as others like them, can only be purchased in complete form and are often expensive as a result. Additionally, since these traps can only be purchased in complete form, they are incapable of being customized to meet the specific situation of the purchaser.

SUMMARY OF THE INVENTION

It is an object of the present invention to overcome the drawbacks of the prior art.

It is a further object of the present invention to provide a kit for making an insect trap.

It is a still further object of the present invention to provide an inexpensive kit which can be used to easily construct an insect trap.

It is yet a still further object of the present invention to provide a kit for making an insect trap, which is capable of being customized.

The present invention is a kit for making an insect trap. The kit includes a base with an adhesive, for trapping insects, bridges or dividers to position on the adhesive, for creating passageways onto the adhesive and a removable trap cover, which is supported on the bridges or dividers.

The adhesive is one suitable for trapping and holding insects until their demise. An attractant, such as sugar or vegetable oil, may be mixed in the adhesive for luring insects onto the adhesive. Preferably, an insecticide is not added to the adhesive to allow a user to construct an environmentally friendly insect trap, which is safe for children and household pets.

Peripheral edges of the base are not coated with adhesive so that insects caught by the trap are caught once they have crawled inside the trap, to prevent the unsightly appearance of insects hanging outside the trap.

The base supplied in the kit may be made of cardboard, or other suitable material, which can be cut to a desired size. The adhesive may be a tape or glue which is applied to the base. When tape is used as the adhesive, it may be supplied in the form of a roll of tape, with or without double-sided adhesive, and may be used with or without a separate base. In other words, the base of the insect trap can be an adhesive tape. Preferably, the adhesive tape lacks an adhesive coating on the edges thereof, to allow for holding insects that have entered the trap, instead of holding insects that are hanging out of the trap. Additionally, the adhesive tape supplied may be narrower, lengthwise, than the cover, which would also serve to enable holding of insects which have entered the trap, rather than have insects being held by the adhesive which are hanging out of the trap. It is possible that the kit include a roll of adhesive having bridges already placed on the adhesive at regular or irregular intervals.

The bridges or dividers may be made of plastic or another suitable material. These bridges can be placed on the adhesive at intervals, desired by the user, to create passageways into the trap. For example, a user may require a small insect trap, with only room for a single passageway. Large insect traps may contain several passageways, or only a single passageway, depending on the size of the insect which the user desires to trap. Additionally, the bridges can be used to hold the removable cover.

The cover can be made of the same material as the base. For example, the cover may be supplied in the form of a roll of tape. Additionally, the cover may be made of cardboard, or other suitable material, which can be cut to a desired size. The cover can be made of a thin plastic or a special paper, whose color and/or design may be specifically chosen to enhance its beauty. When the cover is not used, the trap can be used to catch flying insects. It is preferable that the edges of the cover hang over non-adhesive areas of the base, if a cover is desired at all, to try and prevent the appearance of insects hanging out of the trap.

The base and cover can be rolled together on the same roll for ease of packaging.

The above and other objects, features an advantages of the invention will become readily apparent from the following detailed description thereof which is to be read in connection with the accompanying drawings.

BRIEF DESCRIPTION OF THE DRAWINGS

FIG. 1 is a plan view of a base.

FIG. 2 is an exploded plan view of a base with bridges.

FIG. 3 is a perspective view of an example of an assembled kit.

FIG. 4 is a side view of a base in the form of a roll of tape.

FIG. 5 is a side view of a cover in the form of a roll of tape.

FIG. 6 is a side view of an example of an assembled kit.

FIG. 7 is a plan view of an example of an unassembled kit.

FIG. 8 is a perspective view of a combined base and cover in the form of a roll of tape.

FIG. 9 is a perspective view of an end portion of the roll of FIG. 8.

DETAILED DESCRIPTION OF THE INVENTION

Referring to FIG. 1, a base 1 has an adhesive 2, but not at its edges 3. The base may be of the type unrolled from a roll of tape 7, as shown in FIG. 4. Alternatively, base 1 may be made of cardboard or a similar material which is easily cut and has an adhesive 2 applied down its middle portion and away from its edges 3. Further, base 1 may have adhesive on its bottom, not shown, to make it easier to fix the assembled insect trap in place. Towards this end, when the base 1 is in a form of a roll of tape, as shown in FIG. 4, the roll may be of what is commonly known as double-sided tape. The adhesive 2 contains a bait for insects, such as sugar or a food-type oil, including, but not limited to, vegetable oil, corn oil, sunflower oil, olive oil, etc. In this manner, insects will be drawn to enter the trap and will be "trapped" in the trap, by the adhesive, once they have entered the trap. Then, the insect will be left to its natural demise. The width of the base 1 can be selected according to the needs of the user. For example, the width of the base 1 may be 1.6–2 inches, while the width of the adhesive 2 on the base 1 may be 0.8–1 inch. Thus, both edges 3 would each be 0.4–0.5 inch.

Referring to FIG. 2, bridges 4 are shown placed approximately equidistant from each other on adhesive 2. However, since the present invention is a kit, the distance between bridges 4 can be determined by the user based on the needs of the user.

An example of an assembled kit 5 is shown with a cover 6 in FIG. 3. However, it is also possible to assemble the kit without a cover, as in FIG. 2, to catch flying insects. The cover 6 may be made of cardboard or another suitable material capable of being easily cut. Additionally, the cover 6 may have adhesive on the side facing the base, not shown, to allow it to be easily fixed to the bridges 4. Further, it is possible that the cover 6 be supplied as a roll of tape, as shown in FIG. 5.

As can be seen in FIG. 6, the edges 3 of the base 1 and edge portions of the cover 6 extend past bridges 4 to prevent an unsightly view of an insect hanging out of the assembled insect trap 5, which would otherwise occur if the adhesive 2 extended to the edges of the base 1. It is also possible to accomplish the aim of preventing the occurrence of insects hanging out of the insect trap 5 if the base 1 includes only the adhesive 2 and not the edges 3 so that the base 1 is narrower in width than the cover 6 and is approximately equal to the width of the bridges 4.

Referring to FIG. 8, a combination roll of tape has a base 1 and a cover 6 on the same roll. A strip of wax paper, not shown, may be used between the base 1 and the cover 6 if the cover 6 has adhesive, not shown, which faces the adhesive 2 on the base 1. As can be seen in FIG. 9, the base 1 has a bottom 7, which may have an adhesive 8 to secure the base 1 on a surface.

In a kit containing the roll of FIG. 8, bridges 4 can be used as shown in FIGS. 2 and 3. It is preferable to secure the cover 6 on the bridges 4 by either using a cover 6 having adhesive coated on the side facing the bridges 4 or by coating an adhesive on the side of the bridges 4 facing the cover 6. A user simply unrolls the combination roll of FIG. 8 to a desired length, cuts it, pulls apart the base 1 from the cover 6, places bridges 4 on the base 1 and places the cover 6 on the bridges 4. Additionally, in an example of a kit, not shown, the bridges 4 may be rolled up with the base 1 and cover 6 of FIG. 8.

An example of a kit of the present invention containing a roll of adhesive tape for the base 1 and a roll of adhesive tape for the cover 6 and bridges 4 is shown in FIG. 7. The kit shown in FIG. 7 is only one example of the present invention. Another example, not shown, would be a kit containing cardboard, or similar material, which can be easily cut and which can be used as the base 1 or the cover 6. In this example, the base 1 or cover 6 may be supplied with adhesive already applied thereon or the kit may include adhesive in the form of glue or tape which can be applied to the base 1 and/or the cover 6 by the user.

In another example, not shown, the kit may include a roll of tape which already has bridges attached to it.

A significant advantage of the present invention is that once the insect trap, made by the kit of the present invention, is full of deceased insects, the user can merely replace the base of the trap, instead of purchasing an entire new trap, as is generally required.

Having described the present invention with reference to the accompanying drawings, it should be appreciated that the present invention is not limited to those examples described, in that various changes and modifications can be effected therein by one of ordinary skill in the art without departing from the scope of the invention as defined by the appended claims.

What is claimed is:

1. An insect trap kit having component parts capable of being assembled for providing an insect trap, the kit comprising the combination of:

a first roll of adhesive tape having marginal lengthwise edges, said adhesive tape being uncoated with adhesive on said marginal lengthwise edges, said adhesive containing a bait capable of luring insects, said adhesive tape serving as a base when said first roll of adhesive tape is unrolled;

at least one bridge, said at least one bridge being adapted to be positioned on said adhesive of said base, thereby creating passageways on said base; and a second roll of adhesive tape, said adhesive tape serving as a cover when said second roll of adhesive tape is unrolled, said cover, formed of said adhesive tape, being adapted to be positioned on said at least one bridge, said cover having marginal lengthwise edges extending over said at least one bridge, whereby said marginal lengthwise edges hang over said at least one bridge.

2. The insect trap kit of claim 1, wherein said first roll of adhesive tape has adhesive on both sides of said adhesive tape.

3. An insect trap kit having component parts capable of being assembled for providing an insect trap, the kit comprising the combination of:

a roll having at least two components rolled thereon, a one of said components being a base and another of said components being a cover, said base having a pair of marginal lengthwise edges on either side and being coated with an adhesive on an area of said base inside of said pair of marginal lengthwise edges, said adhesive containing a bait capable of luring insects;

said base and said cover being rolled together on said roll such that a bottom surface of said cover contacts a top surface of said base, said base and said cover being capable of being pulled apart whereby the bottom surface of said cover no longer contacts the top surface of said base; and at least one bridge, said at least one bridge being adapted to be positioned on said adhesive of said base and under said cover when the bottom surface of said cover no longer contacts the top surface of said base, thereby supporting said cover and creating passageways between said base and said cover.

4. The insect trap kit of claim 3, wherein the passageways between said base and said cover open onto each of said pair of marginal lengthwise edges on either side of said base.

5. An insect trap kit having component parts capable of being assembled for providing an insect trap, the kit comprising a roll of adhesive tape having marginal lengthwise edges, said adhesive tape being uncoated with adhesive on said marginal lengthwise edges, at least one bridge, said at least one bridge being adapted to be positioned on the adhesive of said adhesive tape, thereby creating passageways on said tape, and another roll of adhesive tape, said adhesive tape of said other roll being adapted to be positioned on said at least one bridge.

* * * * *